United States Patent
Hsu et al.

(10) Patent No.: US 8,463,181 B2
(45) Date of Patent: Jun. 11, 2013

(54) COMMUNICATION APPARATUSES AND METHODS FOR FLEXIBLY PROVIDING VARIOUS APPLICATION PROFILES OF A WIRELESS COMMUNICATION SYSTEM

(75) Inventors: Hong-Kai Hsu, Taipei County (TW); Chung-Shine Huang, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 1140 days.

(21) Appl. No.: 12/191,500

(22) Filed: Aug. 14, 2008

(65) Prior Publication Data

US 2010/0041335 A1     Feb. 18, 2010

(51) Int. Cl.
*H04B 7/00*     (2006.01)
(52) U.S. Cl.
USPC ........... 455/41.2; 455/73; 455/558; 455/90.3; 709/217; 709/250; 713/2; 713/151; 439/630
(58) Field of Classification Search
USPC .................. 455/73, 558, 90.3, 41.2; 709/217, 709/250; 713/2, 151; 439/630
See application file for complete search history.

(56) References Cited

U.S. PATENT DOCUMENTS

| 7,631,107 | B2 * | 12/2009 | Pandya | 709/250 |
| 7,685,254 | B2 * | 3/2010 | Pandya | 709/217 |
| 2004/0210320 | A1 * | 10/2004 | Pandya | 700/1 |
| 2005/0108518 | A1 * | 5/2005 | Pandya | 713/151 |
| 2005/0228980 | A1 * | 10/2005 | Brokish et al. | 713/2 |
| 2006/0136570 | A1 * | 6/2006 | Pandya | 709/217 |
| 2007/0202749 | A1 * | 8/2007 | Bhat et al. | 439/630 |

FOREIGN PATENT DOCUMENTS

| TW | 200830183 | 7/2008 |
| WO | WO 2008/042597 | 4/2008 |

OTHER PUBLICATIONS

"SD Specification Part E1 SDIO Specification" Technical Commettee SD Card Association, Version 2.00, Jan. 30, 2008.
"Part K:2, Service Discovery Application Profile", Bluetooth Specification, Version 1.1, Feb. 22, 2001.
"Part K:3, Cordless Telephony Profile", Bluetooth Specification, Version 1.1, Feb. 22, 2008.
"Part K:4, Intercom Profile", Bluetooth Specification, Version 1.1, Feb. 23, 2001.
"Part K:5, Serial Port Profile", Bluetooth Specification, Version 1.1, Feb. 22, 2001.
"Part K:6, Headset Profile", Bluetooth Specification, Version 1.1, Feb. 22, 2001.
"Part K:7, Dial-Up Networking Profile", Bluetooth Specification, Version 1.1, Feb. 22, 2001.

(Continued)

*Primary Examiner* — April G Gonzales
(74) *Attorney, Agent, or Firm* — McClure, Qualey & Rodack, LLP

(57) ABSTRACT

A communication apparatus is provided. The communication apparatus comprises an external memory device and a communication unit. The external memory device stores software functions corresponding to a predetermined application profile of the wireless communication system. The communication unit comprises: a radio transceiver module transceiving radio frequency wireless signals and converting the radio frequency wireless signals to or from baseband signals; a baseband module converting the baseband signals to or from digital signals and processing the digital signals; an internal memory device storing a firmware programmed for controlling the radio transceiver module, the baseband module, and performing a physical layer protocol and a data link layer protocol of the wireless communication system; and a microprocessor accessing the software functions via an interface and executing the firmware and the software functions when implementing the predetermined application profile.

23 Claims, 10 Drawing Sheets

OTHER PUBLICATIONS

"Part K:8, Fax Profile", Bluetooth Specification, Version 1.1, Feb. 22, 2001.
"Part K:10, Generic Object Exchange Profile", Bluetooth Specification, Version 1.1, Feb. 22, 2001.
"Part K:11, Object Push Profile", Bluetooth Specification, Version 1.1, Feb. 22, 2001.
"Part K:12, File Transfer Profile", Bluetooth Specification, Version 1.1, Feb. 22, 2001.
"Part K:13, Synchronization Profiles", Bluetooth Specification, Version 1.1, Feb. 22, 2001.
"Human Interface Device (HID) Profile", Ranata et al., Bluetooth Specification, Version 1.0 adopted, May 22, 2003.
"Advance Audio Distribution Profile Specification", Bluetooth Specification, Version 1.0 adopted, May 22, 2003.
"Basic Imaging Profile, Interoperability Specification", Bluetooth Specification, Jul. 25, 2003.
"Basic Printing Profile", Bluetooth Specification, Feb. 10, 2005.
"Hand-Free Profile", Bluetooth SIG, Adopted Version 1.0, Apr. 29, 2003.
"Hardcopy Cable Replacement Profile, Interoperability Specification", Bluetooth Specification ,Sep. 23, 2002.
"Video Distribution Profile", Bluetooth Specification, Sep. 8, 2004.
Advanced Audio Distribution Profile Specification, Bluetooth SIG, Adopted Version 1.0, May 22, 2003.
"Audio/Video Control Transport Protocol Specification", Bluetooth SIG, Version 1.0 Adopted May 22, 2003.
"Audio/Video Distribution Transport Protocol Specification", Bluetooth SIG, Version 1.0 Adopted May 22, 2003.
"Audio/Video Remote Control Profile", Bluetooth SIG, Version 1.0 Adopted, May 22, 2003.

* cited by examiner

| | |
|---|---|
| 5FFFFFFF ~ 50000000 | ROM Unit |
| 4FFFFFFF ~ 40000000 | RAM Unit |
| 3FFFFFFF ~ 00000000 | External Memory |

FIG. 3

COMMUNICATION APPARATUSES AND METHODS FOR FLEXIBLY PROVIDING VARIOUS APPLICATION PROFILES OF A WIRELESS COMMUNICATION SYSTEM

BACKGROUND OF THE INVENTION

1. Field of the Invention

The invention relates to a wireless communication apparatus, and more particularly to a wireless communication apparatus capable of providing various application profiles.

2. Description of the Related Art

Bluetooth is a wireless protocol utilizing short-range communications technology facilitating both voice and data transmissions over short distances from fixed and/or mobile devices, creating wireless personal area networks (PANs). The intent behind the development of Bluetooth was the creation of a single digital wireless protocol, capable of connecting multiple devices and overcoming issues arising from synchronization of the devices. Bluetooth provides a way to connect and exchange information between devices such as mobile phones, telephones, laptops, personal computers, printers, GPS receivers, digital cameras, and video game consoles over a secure, globally unlicensed Industrial, Scientific, and Medical (ISM) 2.4 GHz short-range radio frequency bandwidth. The Bluetooth specifications are developed and licensed by the Bluetooth Special Interest Group (SIG).

BRIEF SUMMARY OF THE INVENTION

Communication apparatuses are provided. An embodiment of such a communication apparatus capable of wireless communication in a wireless communication system comprises an external memory device and a communication unit. The external memory device stores a plurality of software functions corresponding to a predetermined application profile of the wireless communication system. The communication unit comprises a radio transceiver module, a baseband module, an internal memory device, and a microprocessor. The radio transceiver module transceives a plurality of radio frequency wireless signals, and converts the radio frequency wireless signals to or from a plurality of baseband signals. The baseband module converts the baseband signals to or from a plurality of digital signals, and processes the digital signals. The internal memory device stores a firmware programmed for controlling the radio transceiver module, the baseband module, and performing a physical layer protocol and a data link layer protocol of the wireless communication system. The microprocessor accesses the software functions via an interface, and executes the firmware and the software functions when implementing the predetermined application profile.

An embodiment of a method is provided for manufacturing a chip for flexibly providing various application profiles of a wireless communication system with a communication unit and an external memory device. The communication unit contains at least an internal memory device, a microprocessor, and a plurality of hardware devices capable of wireless communication according to a physical layer protocol of the wireless communication system. The method comprises: providing a first die of the external memory device storing a plurality of software functions corresponding to an application profile; providing a second die of the communication unit, in which further contains at least the internal memory device storing a firmware programmed for controlling the hardware devices and performing the physical layer protocol and a data link layer protocol of the wireless communication system; and encapsulating the first and second dies into the same package.

An embodiment of a method is provided for flexibly providing various application profiles of a wireless communication system via a communication unit and an external memory device, wherein the communication unit comprises an internal memory device, a microprocessor, and a plurality of hardware devices capable of wireless communication according to a physical layer protocol of the wireless communication system. The method comprises: storing a plurality of first software functions corresponding to a first application profile in the external memory device; storing a firmware programmed for controlling the hardware devices and performing the physical layer protocol and a data link layer protocol of the wireless communication system in the internal memory device; electrically connecting the external memory device to the communication unit; accessing the first software functions via an interface; and executing the firmware and first software functions so as to implement the first application profile.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows an exemplary memory space of an external memory device and an internal memory device according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
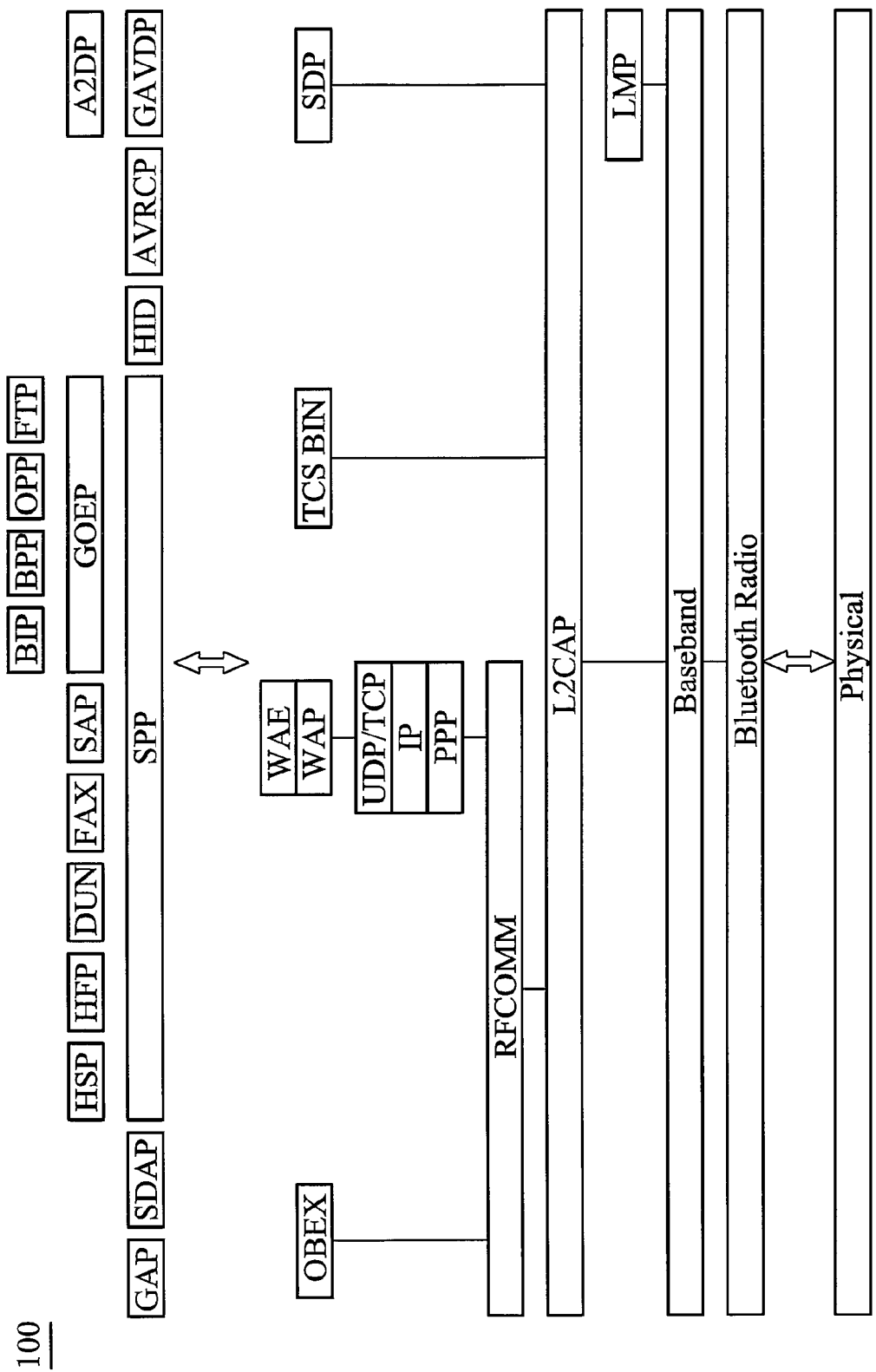
FIG. 1 shows an exemplary Bluetooth layer architecture.

FIG. 1 shows an exemplary Bluetooth layer architecture 100. In the Bluetooth layer architecture 100, the bottom layer is a physical layer, which defines the protocol of hardware devices such as the Bluetooth modem, radio frequency transceiver, or others, adopted in the Bluetooth wireless communication system. The Bluetooth layer protocol architecture above the physical layer consists of core protocols, cable replacement protocols, telephony control protocols, and adopted protocols. Bluetooth's core protocols form a five-layer stack, consisting of: a Bluetooth Radio, a Baseband, a Link Manager Protocol (LMP), a Logical Link Control and Adaptation Protocol (L2CAP), and a Service Discovery Protocol (SDP). The Bluetooth Radio consists of specific details of the air interface, including frequency, frequency hopping, modulation scheme, and transmission power. The Baseband is concerned with establishing a connection within a piconet, addressing, packet format, timing, and power control. The Link Manager Protocol (LMP) establishes the link setup between Bluetooth devices and manages ongoing links, including security aspects (e.g. authentication and encryption), and control and negotiation of baseband packet size. The Logical Link Control and Adaptation Protocol (L2CAP) adapts the upper-layer protocols to the baseband layer, providing both connectionless and connection-oriented services. The Service Discovery Protocol (SDP) handles device information, services, and queries for service characteristics between two or more Bluetooth devices.

Radio frequency communications (RFCOMM) is the cable replacement protocol used to create a virtual serial port which replaces cable technologies through minimal modification of existing devices. RFCOMM provides for binary data transport and emulates Recommended Standard 232 (RS-232) control signals over the Bluetooth baseband layer. Telephony control protocol-binary (TCS BIN) is the bit-oriented protocol that defines the call control signaling for the establishment of voice and data calls between Bluetooth devices. Additionally, TCS BIN defines mobility management procedures for handling groups of Bluetooth TCS devices.

Adapted protocols are defined by other standards-making organizations and incorporated into Bluetooth's protocol stack, allowing Bluetooth to create protocols only when necessary. The adopted protocols include a Point-to-Point Protocol (PPP), TCP/IP/UDP, an Object Exchange Protocol (OBEX) and a Wireless Application Environment/Wireless Application Protocol (WAE/WAP). The Point-to-Point Protocol (PPP) is an internet standard protocol for transporting IP datagrams over a point-to-point link. The TCP/IP/UDP are the foundation Protocols for a TCP/IP protocol suite. The Object Exchange Protocol (OBEX) is the session-layer protocol for the exchange of objects, providing a model for object and operation representation. The Wireless Application Environment (WAE) specifies an application framework for wireless devices and the Wireless Application Protocol (WAP) is an open standard to provide mobile users access to telephony and information services.

In order to use Bluetooth, a device must be compatible with certain Bluetooth profiles. A Bluetooth profile is a wireless interface specification for a specific Bluetooth service. The Bluetooth profile describes how to accomplish the implementations of Bluetooth devices. FIG. 1 also shows certain Bluetooth profiles above the protocol layer which will be briefly described in the following. Generic Access Profile (GAP) provides the basis for all other profiles. Advanced Audio Distribution Profile (A2DP) is a profile that defines how high quality audio (stereo or mono) can be streamed from one device to another over a Bluetooth connection. For example, music streamed from a mobile phone to a wireless headset. Audio/Video Remote Control Profile (AVRCP) is designed to provide a standard interface to control TVs, Hi-fi equipment, and so on, to allow a user to use a single remote control (or other device) to control all of the user's accessible A/V equipment. Note that the single remote control may be used in concert with the A2DP or VDP. Basic Imaging Profile (BIP) is designed for sending images between devices and includes the ability to resize, and convert images to make them suitable for the receiving device. Basic Printing Profile (BPP) allows devices to send text, e-mails, vCards, or other items to printers based on print jobs.

Dial-up Networking Profile (DUN) provides a standard to access the Internet and other dial-up services over Bluetooth. The most common scenario is to access the Internet from a laptop by wirelessly dialing up on a mobile phone. Fax Profile (FAX) is intended to provide a well defined interface between a mobile phone or fixed-line phone and a PC with fax software installed. File Transfer Profile (FTP) provides access to the file system on another device. This includes support for retrieving folder listings, changing to different folders, retrieving files, placing files and deleting files. General Audio/Video Distribution Profile (GAVDP) provides the basis for the A2DP, and VDP. Generic Object Exchange Profile (GOEP) provides a basis for other data profiles. Hands-Free Profile (HFP) is commonly used to allow car hands-free kits to communicate with mobile phones in the car. Human Interface Device Profile (HID) provides support for devices such as a mouse, joysticks, keyboards, as well as sometimes providing support for simple buttons and indicators on other types of devices. Headset Profile (HSP) is the most commonly used profile, providing support for the popular Bluetooth Headsets to be used with mobile phones for minimal control including the ability to ring, answer a call, hang up and adjust the volume. Object Push Profile (OPP) is a basic profile for sending "objects" such as pictures, virtual business cards, or appointment details. Serial Port Profile (SPP) is based on the ETSI TS 07.10 specification and uses the RFCOMM protocol. SPP emulates a serial cable to provide a simply implemented wireless replacement for the existing RS-232 based serial communications applications, including familiar control signals. Service Discovery Application Profile (SDAP) describes how an application should use the SDP to discover services on a remote device. SIM Access Profile (SAP, SIM) allows devices such as car phones with built in GSM transceivers to connect to a SIM card in a phone with Bluetooth, so that the car phone itself does not require a separate SIM card. Video Distribution Profile (VDP) allows the transport of a video stream. VDP can be used for streaming a recorded video from a PC media center to a portable player, or from a digital video camera to a TV.

Figure 2:
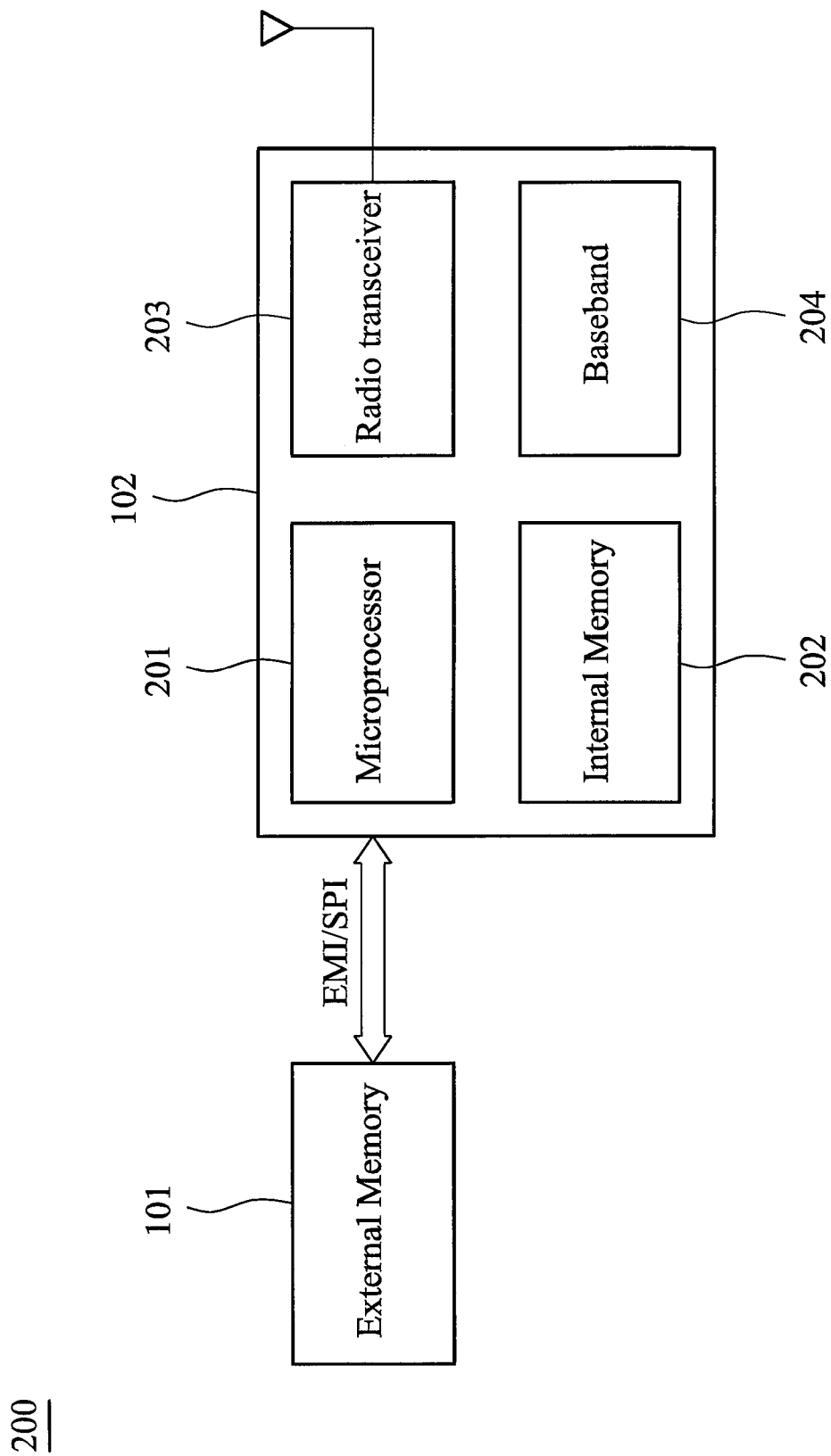
FIG. 2 shows a communication apparatus capable of wireless communication in a wireless communication system according to an embodiment of the invention.

FIG. 2 shows a communication apparatus capable of wireless communication in a wireless communication system according to an embodiment of the invention. Communication apparatus 200 comprises an external memory device 101 and a communication unit 102. The external memory device 101 stores a plurality of software functions corresponding to a predetermined application profile of the wireless communication system. For example, according to an embodiment of the invention, when the wireless communication system is a Bluetooth wireless communication system, the application profile corresponds to a Bluetooth profile as shown in FIG. 1. Communication unit 102 comprises a microprocessor 201, an internal memory device 202, a radio transceiver module 203 and a baseband module 204. The radio transceiver module 203 receives radio frequency wireless signals, converts the received signals to baseband signals to be processed by the baseband module, or receives baseband signals from the baseband module and converts the received signals to radio frequency wireless signals to be transmitted to a peer device. The radio transceiver module 203 may comprises a plurality of hardware devices to perform radio frequency conversion. For example, radio transceiver module 203 may comprise a mixer to multiply the baseband signals with a carrier oscillated in the radio frequency of the wireless communication system, wherein the radio frequency may be 900 MHz or 1800 MHz in a global system for mobile communication (GSM), or may be 2.4 GHz in a Bluetooth wireless communication system. The baseband module 204 further converts the baseband signals to or from a plurality of digital signals, and processes the digital signals. The baseband module 204 may also comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. The internal memory device 202 stores a firmware programmed for controlling the hardware devices of the communication unit, such as the radio transceiver module, the baseband module, and for performing a physical layer protocol and a data link layer protocol of the wireless communication system, wherein the physical layer and data link layer are two of the seven layers defined in the Open Systems Interconnection (OSI) model. The firmware contains program code and is pre-burned in a read only (RO) region of the internal memory device 202. For example, according to an embodiment of the invention, when the wireless communication system is a Bluetooth wireless communication system, the physical layer protocol and the data link layer protocol comprises the Bluetooth radio protocol, the baseband protocol and the link management protocol as shown in FIG. 1.

In this embodiment of the invention, the microprocessor 201 accesses the software functions via an interface, and executes the firmware and the software functions when implementing the predetermined application profile. According to an embodiment of the invention, the microprocessor 201 may access software functions stored in the external memory device 101 via an external memory interface (EMI). The EMI may include address pins, data pins and chip selection pin for controlling the data transmission. Meanwhile, according to another embodiment of the invention, the microprocessor 201 may access software functions stored in the external memory device 101 via a serial peripheral interface (SPI). The SPI is a synchronous serial data link standard that operates in full duplex mode. Devices communicate in a master/slave mode, wherein the master device initiates the data frame. Data transmission begins after the master device configures the clock, the clock polarity and phase with respect to the data with the slave device.

Figure 4:
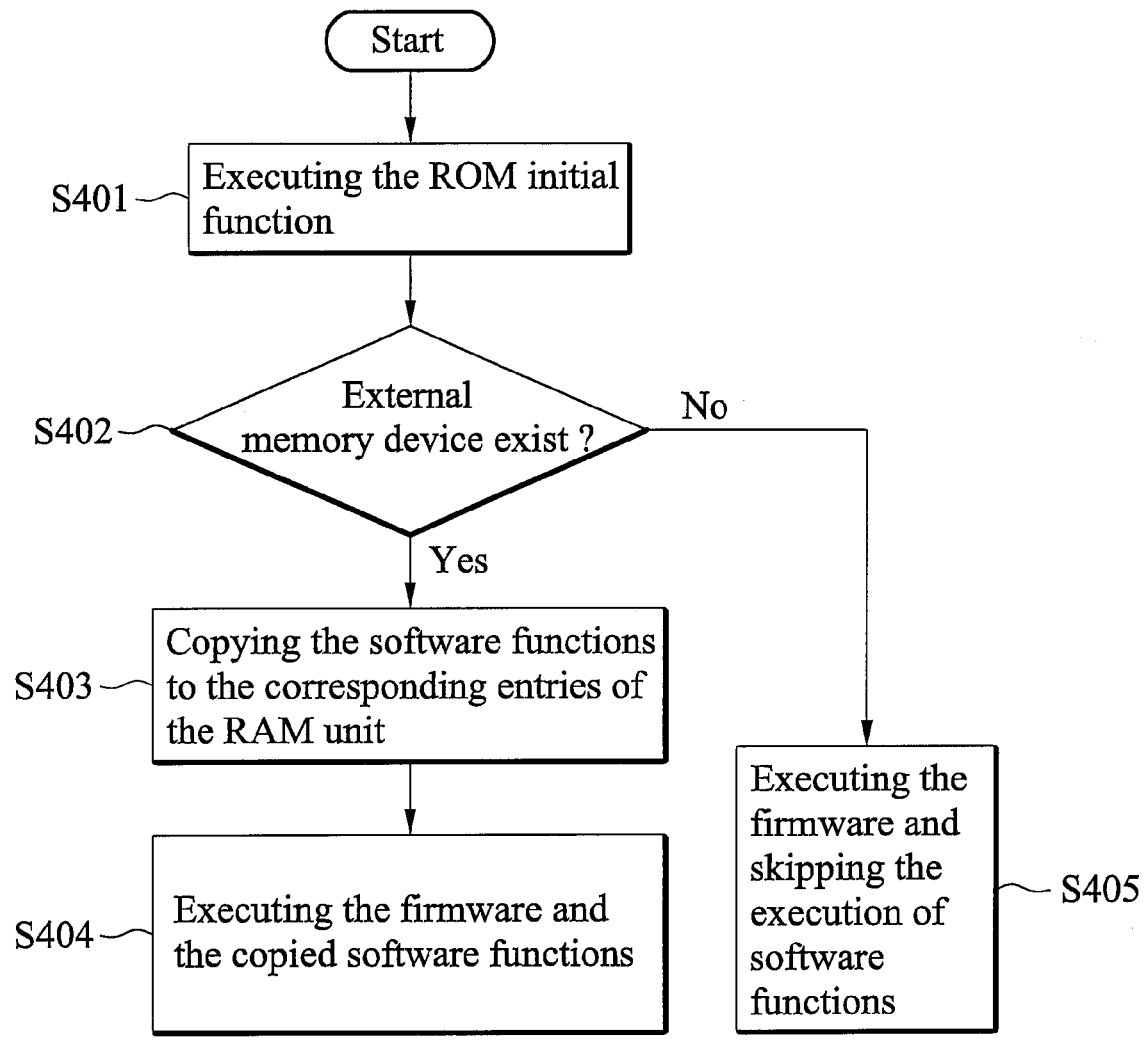
FIG. 4 shows a flowchart performed by a microprocessor according to an embodiment of the invention.

According to an embodiment of the invention, the internal memory device 202 may comprise a read only memory (ROM) unit and a random access memory (RAM) unit, wherein the firmware is stored in the ROM unit. Note that it is unable to modify data or instruction of the ROM unit, or modification of data or instruction of the ROM unit is not allowed. FIG. 3 shows an exemplary memory space of the external memory device 101 and the internal memory device 202 according to an embodiment of the invention. The memory space may be predefined via an image scatter file before packaging the chips. Thus, the corresponding memory address of each function in firmware and software can be known in the design stage. According to an embodiment of the invention, an ROM initial function may be stored in a predefined region of the ROM unit, such as beginning with the address 0x50000000 as shown in FIG. 3, an external memory initial function may be stored in a predefined region of the external memory device 101, such as beginning with the address 0x10000000. In addition, each software function may also be stored in a predefined region of the external memory device 101, and the RAM unit may reserve a plurality of entries for the software functions. According to an embodiment of the invention, the microprocessor 201 may copy the software functions from the external memory device 101 via the interface to the entries of the RAM unit when implementing a predetermined application profile. FIG. 4 shows a flowchart performed by the microprocessor according to an embodiment of the invention. First, the microprocessor 201 acquires the ROM initial function from the predefined region of the ROM unit and executes the ROM initial function (step S401). Next, the microprocessor 201 checks if an external memory device exist (step S402). According to the embodiment of the invention, an external memory device checking function may be called by the ROM initial function when executing and the checking process may be accomplished by checking the polarity of the hardware EMI register, for example, by checking the polarity of the trap pin. If the external memory device 101 exists, the microprocessor 201 copies the software functions from the external memory device 101 to the corresponding entries of the RAM unit (step S403), and then, executes the firmware stored in the ROM unit and the copied software functions stored in the RAM unit to implement the predetermined application profile (step S404). On the other hand, if the external memory device does not exist, the microprocessor 201 executes the firmware stored in ROM unit and skips execution of software functions of the RAM unit for implementing application profile since their entries are empty (step S405).

Figure 5:
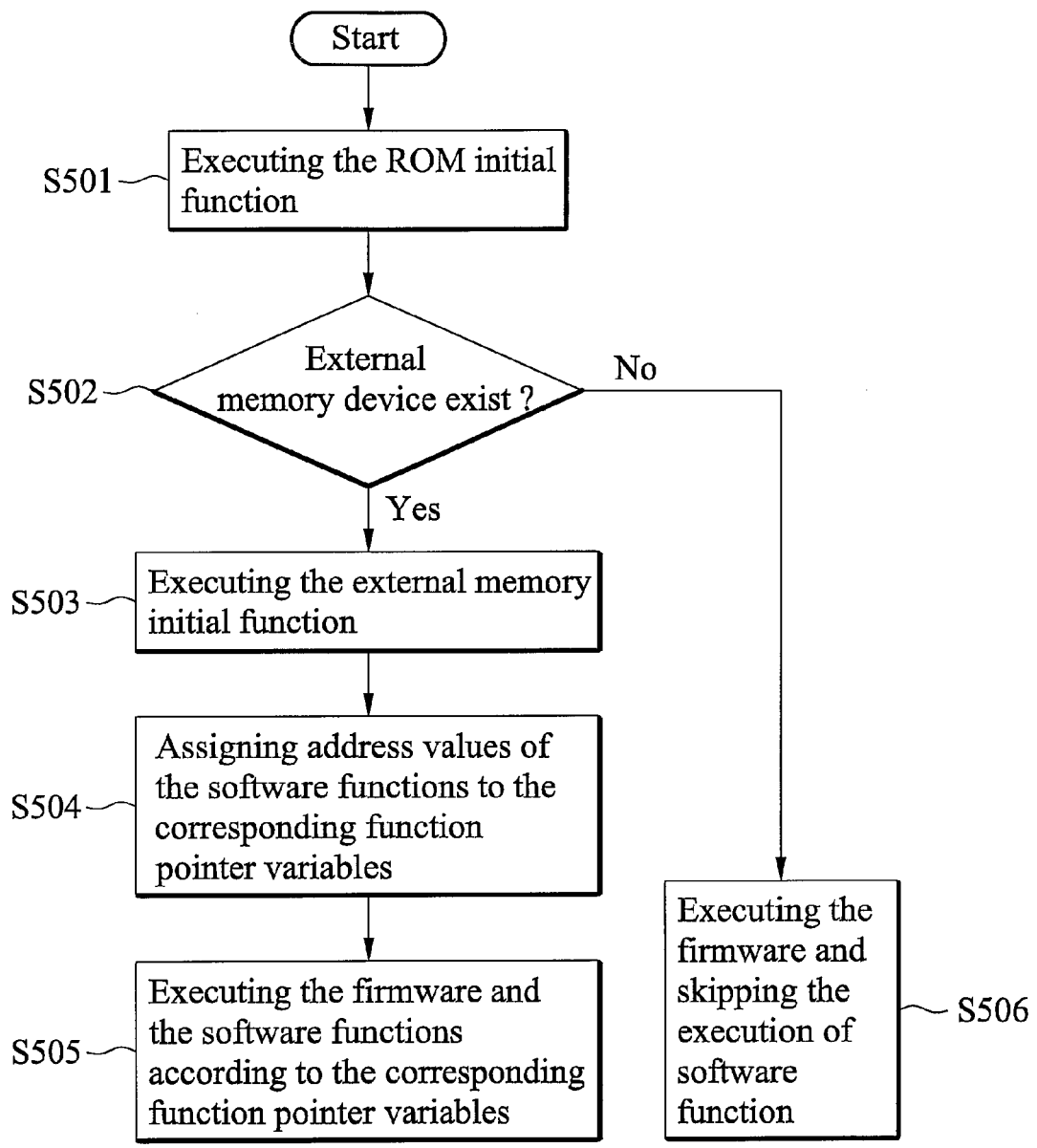
FIG. 5 shows a flowchart performed by a microprocessor according to another embodiment of the invention.

According to another embodiment of the invention, the microprocessor 201 may directly execute the software functions stored in the external memory device 101 when implementing the predetermined application profile, which is called execution in place. In this embodiment, the RAM unit further stores a plurality of function pointer variables, wherein the function pointer variables are assigned to zero during initialization, and the microprocessor 201 further assigns address values of the software functions to the corresponding function pointer variables, and executes the software functions stored in the external memory device 101 according to the corresponding function pointer variables when implementing the predetermined application profile. FIG. 5 shows a flowchart performed by the microprocessor 201 according to another embodiment of the invention. First, the microprocessor 201 acquires the ROM initial function from the predefined region of the ROM unit and executes the ROM initial function (step S501). Next, the microprocessor checks if an external memory device exist (step S502). If the external memory device exists, the microprocessor 201 acquires an external memory initial function from the external memory device and executes the external memory initial function (step S503), wherein the external memory initial function may be called by the ROM initial function when executing. Since, as mentioned previously, the corresponding memory address of each function of firmware and software can be known during the design stage, the microprocessor 201 may access and execute the external memory initial function according to the pre-known memory address. Next, the microprocessor 201 assigns address values of the software functions of the external memory device to the corresponding function pointer variables stored in the RAM unit (step S504). Next, after initiating the external memory device, the execution is returned to the ROM initial function and the microprocessor 201 executes the firmware stored in ROM unit and the software functions stored in the external memory device according to the corresponding function pointer variables to implement the predetermined application profile (step S505). On the other hand, if the external memory device does not exist, the microprocessor 201 executes the firmware stored in the ROM unit and skips execution of software functions for implementing application profile since their corresponding function pointers are still assigned zero (step S506).

Figure 6A:
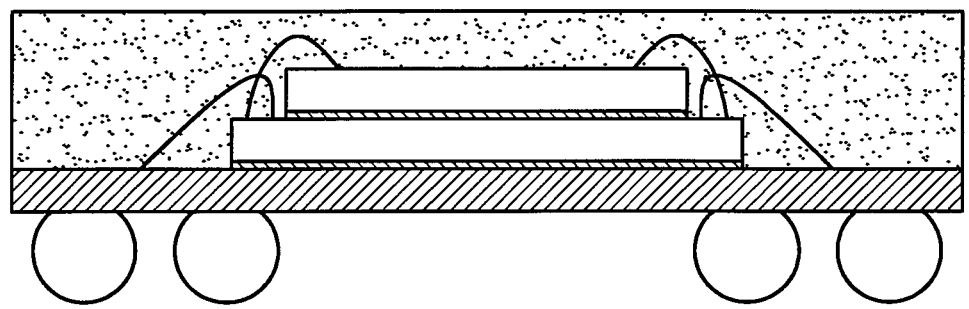
FIG. 6A and FIG. 6B show exemplary semiconductor packaging architectures.
Figure 6B:
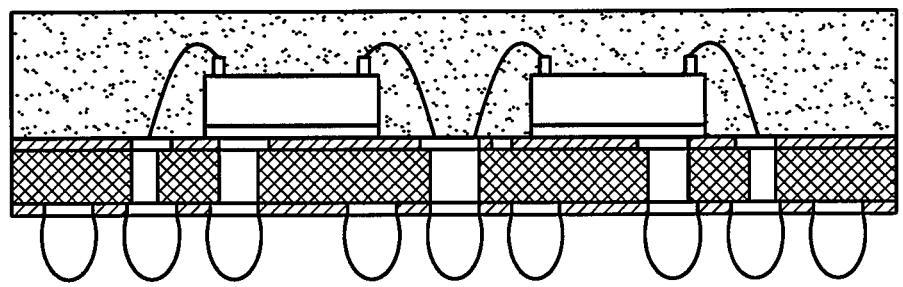

The communication unit may be integrated in a first die and the external memory device may be integrated in a second die. The external memory device may be a flash memory, an embedded ROM, or a mask ROM. According to an embodiment of the invention, the first die and the second die may be electrically connected to each other and be packaged in a semiconductor chip package. The packaging method may be die to die packaging, such as a Stacked Thin & Fine-pitch Ball Grid Array (STFBGA) or Stacked Very-Thin & Fine-pitch Ball Grid Array (SVFBGA) as shown in FIG. 6A, or a Multi-Chip Module Thin & Fine-pitch Ball Grid Array (MCMTFBGA) as shown in FIG. 6B. STFBGA or SVFBGA stacks the external memory device 101 and the communication unit 102 as multiple dice vertically in the same semiconductor chip package. MCMTFBGA arranges the external memory device 101 and the communication unit 102 as multiple dice horizontally in the same semiconductor chip package. Because the software functions of the upper layer application profiles of the wireless communication system are stored in the external memory device, and firmware of the lower layer functions of the wireless communication system are stored in the ROM unit of the internal memory device, flexibility may be achieved as one of various application profiles is provided by simply providing a particular external memory devices which store the corresponding software functions for a determined application profiles. According to an embodiment of the invention, flexibly providing various application profiles can be accomplished by providing another external memory die, a third die for example, storing the corresponding software functions of different application profiles in the third die, electrically connecting the third die with the first die, and packaging the firs die and the third die in a semiconductor chip package. Thus, the internal memory device of the communication unit is not required to store the corresponding upper layer software functions of the application profiles and the die of the communication unit may be reused every time it is required to provide different application profiles. In this way, the communication apparatus may be capable of providing various application profiles by accessing the software functions stored in the external memory devices.

Figure 7:
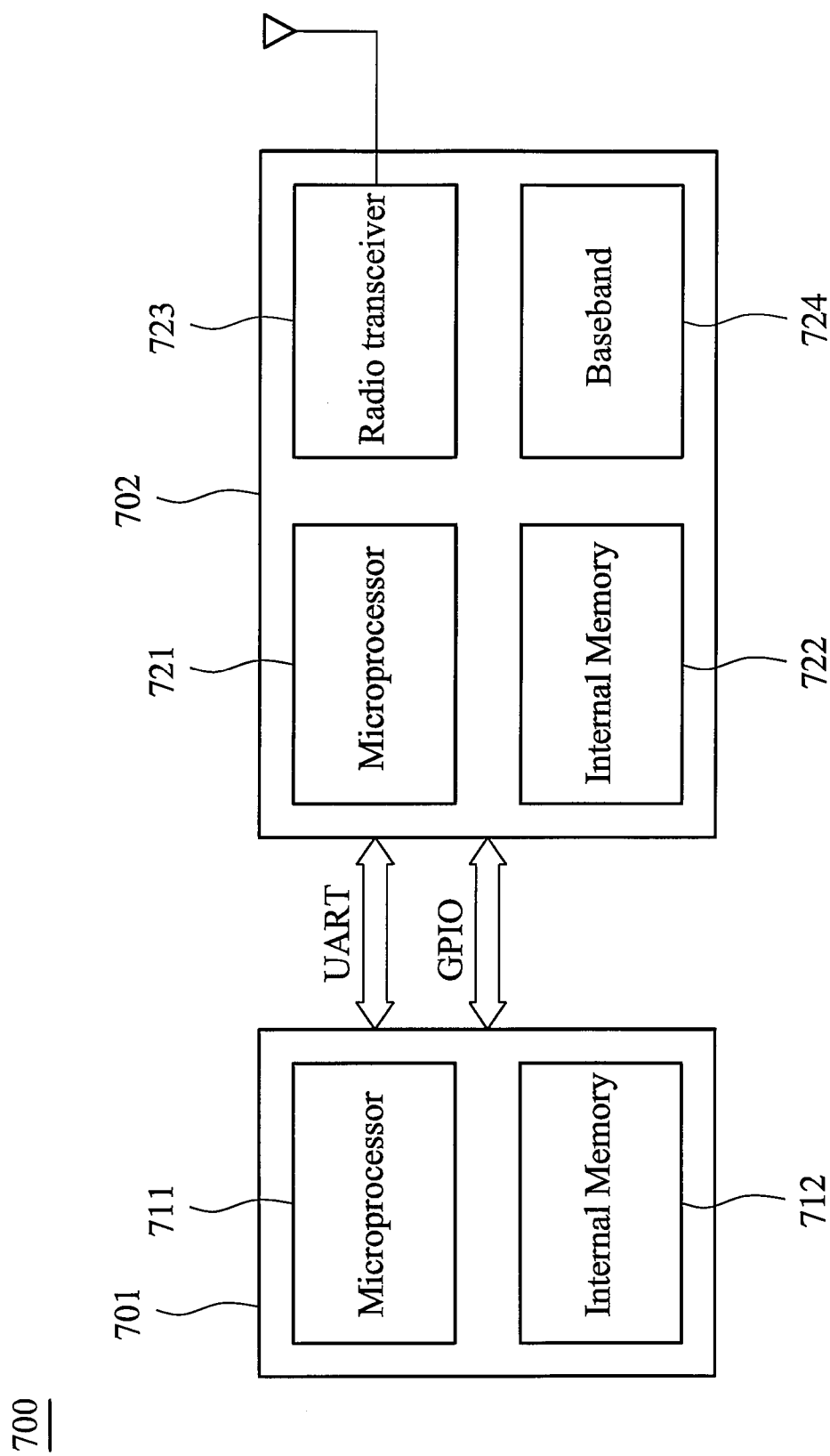
FIG. 7 shows a communication apparatus capable of wireless communication in a wireless communication system according to another embodiment of the invention.

FIG. 7 shows a communication apparatus capable of wireless communication in a wireless communication system according to another embodiment of the invention. Communication apparatus 700 comprises a host 701 and a communication unit 702. Host 701 comprises a microprocessor 711 and an internal memory device 712. The internal memory device 712 stores a plurality of software functions corresponding to a predetermined application profile of the wireless communication system. For example, according to an embodiment of the invention, when the wireless communication system is a Bluetooth wireless communication system, the application profile corresponds to a Bluetooth profiles as shown in FIG. 1. Communication unit 702 comprises a microprocessor 721, an internal memory device 722, a radio transceiver module 723 and a baseband module 724. Detailed description of each element in communication unit 702 will be omitted here for the sake of brevity, as reference may be made to the prior descriptions of FIG. 2. According to the embodiment of the invention, the corresponding software functions of the upper layer application profiles of the wireless communication system are stored in the internal memory device 712 and executed by the microprocessor 711 in the host 701. The microprocessor 711 further transmits commands and data via Universal Asynchronous Receiver/Transmitter (UART), and controls the hardware devices of the communication unit 702 via the General Purpose Input/Output (GPIO). The microprocessor 721 of the communication unit 702 receives the commands and data sent from the microprocessor 711, performs the commands, and executes the corresponding lower layer functions of the wireless communication system to control the hardware devices and lower layer protocol.

Figure 8:
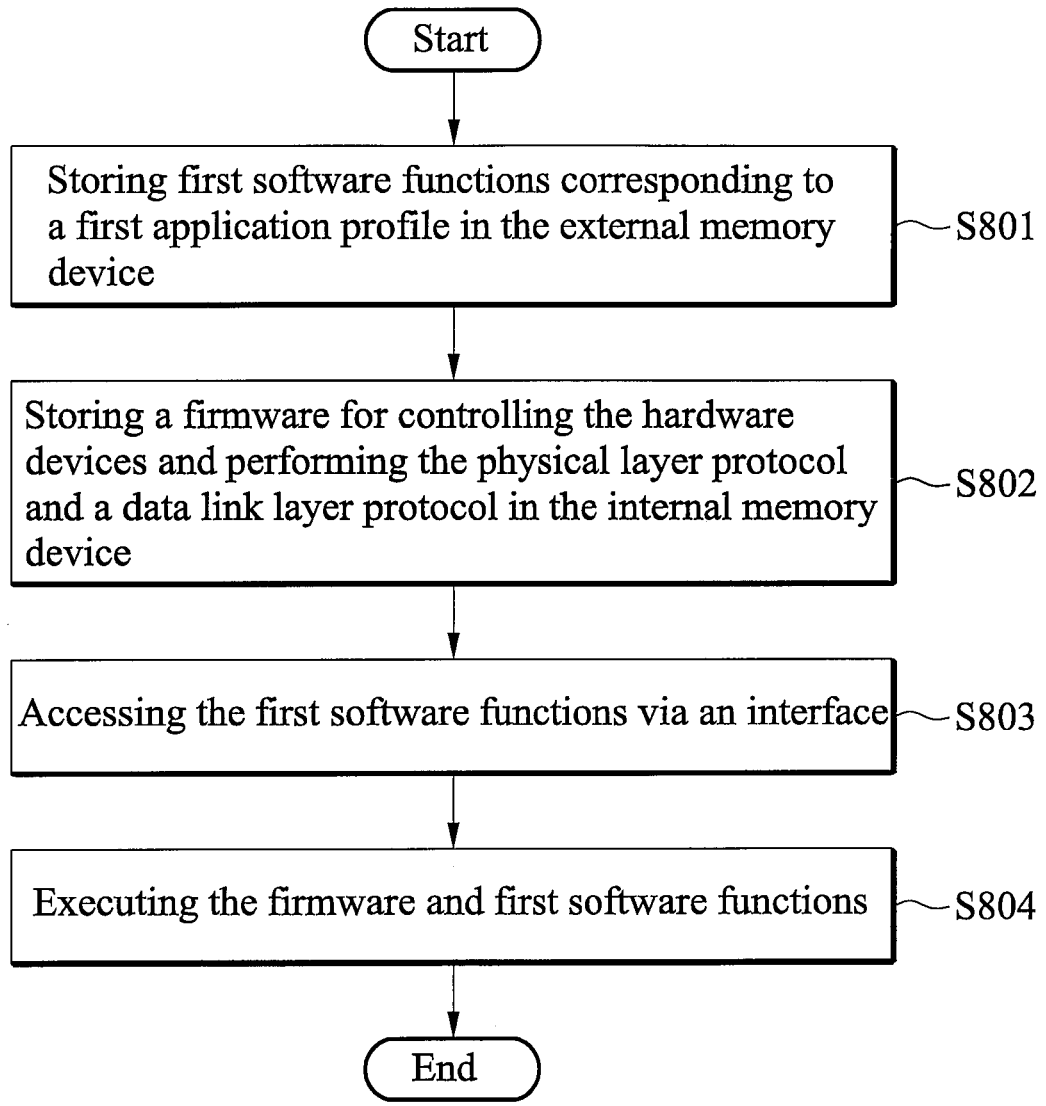
FIG. 8 shows a flowchart of an embodiment of a method for flexibly providing various application profiles of a wireless communication system via a communication unit and an external memory device.
Figure 9:
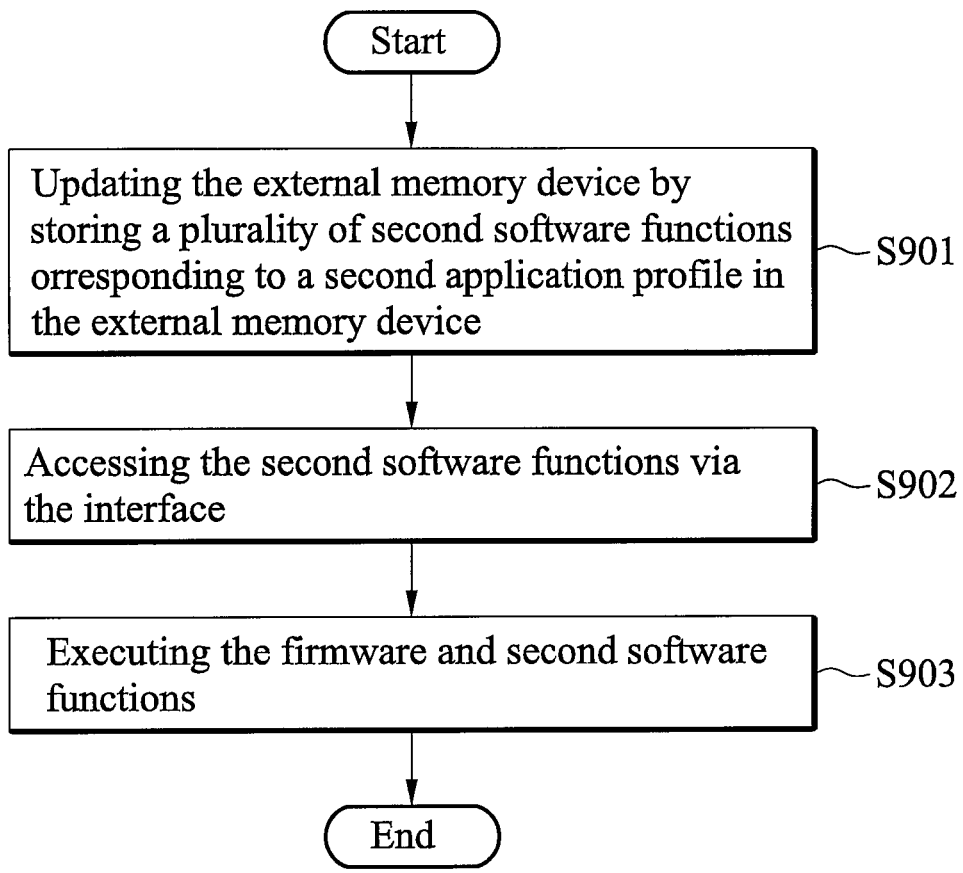
FIG. 9 shows a flowchart of an embodiment of a method for providing different application profiles.

FIG. 8 shows a flowchart of an embodiment of a method for flexibly providing various application profiles of a wireless communication system via a communication unit (e.g. 102 of FIG. 2) and an external memory device (e.g. 101 of FIG. 2). The communication unit comprises an internal memory device (e.g. 202 of FIG. 2), a microprocessor (e.g. 201 of FIG. 2), and a plurality of hardware devices (e.g. 203 and 204 of FIG. 2, and the similar) capable of wireless communication according to a physical layer protocol of the wireless communication system. The external memory device is die-to-die connected to the communication unit, referring to FIG. 6A or 6B. First, a plurality of first software functions corresponding to a first application profile is stored in the external memory device (Step S801). Next, a firmware for controlling the hardware devices and performing the physical layer protocol and a data link layer protocol of the wireless communication system is stored in the internal memory device (Step S802). Next, the first software functions are accessed via an interface (Step S803). Finally, the firmware and first software functions are executed so as to implement the first application profile (Step S804). According to the embodiment of the invention, various application profiles may be implemented by just updating software functions stored in the external memory device. FIG. 9 shows a flowchart of an embodiment of a method for providing different application profiles. First, a plurality of second software functions corresponding to a second application profile are stored in the external memory device for updating the external memory device (Step S901). Next, the second software functions are accessed via the interface (Step S902). Finally, the firmware and second software functions are executed so as to implement the second application profile (Step S903).

Figure 10:
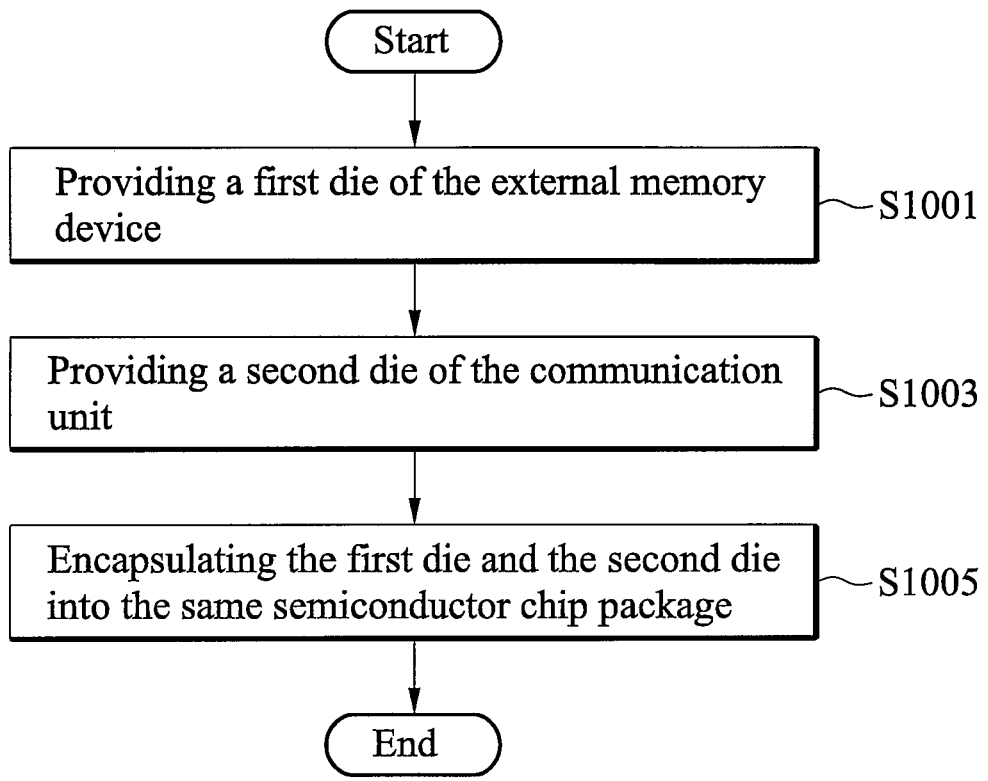
FIG. 10 shows a flowchart illustrating an embodiment of a method for manufacturing a chip.

FIG. 10 shows a flowchart illustrating an embodiment of a method for manufacturing a chip for flexibly providing various application profiles of a wireless communication system with a communication unit (e.g. 102 of FIG. 2) and an external memory device (e.g. 101 of FIG. 2). The communication unit contains at least an internal memory device, a microprocessor, and a plurality of hardware devices capable of wireless communication according to a physical layer protocol of the wireless communication system. A first die of the external memory device storing a plurality of software functions corresponding to an application profile is provided (step S1001). A second die of the communication unit is provided, in which further contains at least the internal memory device storing a firmware programmed for controlling the hardware devices and performing the physical layer protocol and a data link layer protocol of the wireless communication system (step S1003). And then, the first die and the second die are encapsulated into the same semiconductor chip package (step S1005). The first die and the second die may be vertically stacked or horizontally arranged in the same semiconductor chip package.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus capable of wireless communication in a wireless communication system, comprising:
   an external memory device storing a plurality of software functions corresponding to a predetermined application profile for implementing of a Bluetooth profile in the wireless communication system; and
   a communication unit comprising:
   a radio transceiver module transceiving a plurality of radio frequency wireless signals, and converting the radio frequency wireless signals to or from a plurality of baseband signals;
   a baseband module converting the baseband signals to or from a plurality of digital signals, and processing the digital signals;
   an internal memory device storing a firmware programmed for controlling the radio transceiver module, the baseband module, and performing a physical layer protocol and a data link layer protocol of the wireless communication system; and
   a microprocessor accessing the software functions via an interface, and executing the firmware and the software functions when implementing the predetermined application profile.

2. The communication apparatus as claimed in claim 1, wherein the interface is an external memory interface (EMI) or a serial peripheral interface (SPI).

3. The communication apparatus as claimed in claim 1, wherein the internal memory device comprises a read only memory (ROM) unit and a random access memory (RAM) unit, and wherein the firmware is stored in the ROM unit.

4. The communication apparatus as claimed in claim 3, wherein the modification of data or instruction of the ROM unit is not allowed.

5. The communication apparatus as claimed in claim 3, wherein the microprocessor copies the software functions from the external memory device via the interface to the RAM unit when implementing the predetermined application profile.

6. The communication apparatus as claimed in claim 3, wherein the microprocessor directly executes the software functions stored in the external memory device when implementing the predetermined application profile.

7. The communication apparatus as claimed in claim 6, wherein the RAM unit further stores a plurality of function pointer variables, and wherein the microprocessor further assigns address values of the software functions to the corresponding function pointer variables, acquires and executes the software functions stored in the external memory device according to the corresponding function pointer variables when implementing the predetermined application profile.

8. The communication apparatus as claimed in claim 1, wherein the communication unit is integrated in a first die and the external memory device is integrated in a second die.

9. The communication apparatus as claimed in claim 8, wherein the first die and the second die are electrically connected to each other and are packaged in the same semiconductor chip package.

10. The communication apparatus as claimed in claim 1, wherein the external memory device is a flash memory, or an embedded ROM, or a mask ROM.

11. The communication apparatus as claimed in claim 1, wherein the wireless communication system is a Bluetooth wireless communication system, and wherein the physical layer protocol and the data link layer protocol comprises the Bluetooth radio protocol, the baseband protocol and the link management protocol.

12. A method for manufacturing a chip for flexibly providing various application profiles of a wireless communication system with a communication unit and an external memory device, wherein the communication unit comprises an internal memory device, a microprocessor, and a plurality of hardware devices capable of wireless communication according to a physical layer protocol of the wireless communication system, the method comprising:
   providing a first die of the external memory device storing a plurality of software functions corresponding to an application profile for implementing of a Bluetooth profile;
   providing a second die of the communication unit comprising the internal memory device storing a firmware programmed for controlling the hardware devices and performing the physical layer protocol and a data link layer protocol of the wireless communication system; and
   encapsulating the first die and the second die into the same semiconductor chip package.

13. The method as claimed in claim 12, wherein the first die and the second die are vertically stacked in the same semiconductor chip package.

14. The method as claimed in claim 12, wherein the first die and the second die are horizontally arranged in the same semiconductor chip package.

15. The method as claimed in claim 12, wherein the application profile is a wireless interface specification for a specific Bluetooth service, and the physical layer protocol and the data link layer protocol comprises the Bluetooth radio protocol, the baseband protocol and the link management protocol.

16. A method for flexibly providing various application profiles of a wireless communication system via a communication unit and an external memory device, wherein the communication unit comprises an internal memory device, a microprocessor, and a plurality of hardware devices capable of wireless communication according to a physical layer protocol of the wireless communication system, the method comprising:
   storing a plurality of first software functions corresponding to a first application profile for implementing of a Bluetooth profile in the external memory device;
   storing a firmware programmed for controlling the hardware devices and performing the physical layer protocol and a data link layer protocol of the wireless communication system in the internal memory device;
   accessing the first software functions via an interface; and
   executing the firmware and first software functions so as to implement the first application profile,
   wherein the external memory device is die-to-die connected to the communication unit.

17. The method as claimed in claim 16, wherein the interface is an external memory interface (EMI) or a serial peripheral interface (SPI).

18. The method as claimed in claim 16, wherein the internal memory device comprises a read only memory (ROM) unit and a random access memory (RAM) unit, and wherein the firmware is stored in the ROM unit.

19. The method as claimed in claim 18, further comprising:
   copying the first software functions from the external memory device via the interface to the RAM unit.

20. The method as claimed in claim 18, further comprising:
   directly executing the first software functions stored in the external memory device.

21. The method as claimed in claim 20, further comprising:
assigning a plurality of corresponding address values of the first software functions to a plurality of function pointer variables stored in the RAM unit; and
executing the first software functions stored in the external memory device according to the corresponding function pointer variables when implementing the first application profile.

22. The method as claimed in claim 16, further comprising:
updating the external memory device by storing a plurality of second software functions corresponding to a second application profile in the external memory device;
accessing the second software functions via the interface; and
executing the firmware and second software functions so as to implement the second application profile.

23. The method as claimed in claim 16, wherein the wireless communication system is a Bluetooth wireless communication system, the first application profile and the second application profile respectively corresponds to different Bluetooth profiles, and wherein the physical layer protocol and the data link layer protocol comprises the Bluetooth radio protocol, the baseband protocol and the link management protocol.

* * * * *